US007702404B2

(12) United States Patent
Kentish et al.

(10) Patent No.: US 7,702,404 B2
(45) Date of Patent: Apr. 20, 2010

(54) DIGITAL AUDIO PROCESSING

(75) Inventors: William Edmund Cranstoun Kentish, Chipping Norton (GB); Peter Damien Thorpe, St Kilda (AU)

(73) Assignee: Sony United Kingdom Limited, Weybridge (GB)

( * ) Notice: Subject to any disclaimer, the term of this patent is extended or adjusted under 35 U.S.C. 154(b) by 1323 days.

(21) Appl. No.: 10/812,145

(22) Filed: Mar. 29, 2004

(65) Prior Publication Data

US 2004/0260559 A1 Dec. 23, 2004

(30) Foreign Application Priority Data

Mar. 31, 2003 (GB) ................................ 0307456.4

(51) Int. Cl.
*G06F 17/00* (2006.01)

(52) U.S. Cl. ........................................................ 700/94

(58) Field of Classification Search ................... 700/94; 713/176

See application file for complete search history.

(56) References Cited

U.S. PATENT DOCUMENTS

2003/0028381 A1 2/2003 Tucker et al.

FOREIGN PATENT DOCUMENTS

| | | |
|---|---|---|
| EP | 1 189 372 | 3/2002 |
| WO | WO 99/55089 | 10/1999 |
| WO | WO 01/29691 | 4/2001 |
| WO | WO 01/45410 | 6/2001 |

OTHER PUBLICATIONS

Herre J et al: "Compatible scrambling of compressed audio" Applications of Signal Processing to Audio and Acoustics, 1999 IEEE Workshop on New Paltz, NY, USA, Oct. 17-20, 1999, Piscataway, NJ, USA, IEEE, US, Oct. 17, 1999, pp. 27-30, XP010365060.

Koukopoulos D K et al: "A Compressed-Domain Watermarking Algorithm for MPEG Audio Layer 3" ACM Multimedia 2001 Workshops. Multimedia and Security: New Challenges. Ottawa, Canada, Oct. 5, 2001, ACM Multimedia Conference, New York, NY: ACM, US, Oct. 5, 2001, pp. 7-10, XP001113656.

*Primary Examiner*—Andrew C Flanders
(74) *Attorney, Agent, or Firm*—Oblon, Spivak, McClelland, Maier & Neustadt, L.L.P.

(57) ABSTRACT

A method of processing a spectrally-encoded digital audio signal comprising band data components representing audio contributions in respective frequency bands comprises the steps of altering a subset comprising one or more of the band data components; and generating recovery data to allow the original values of the altered band data components to be reconstructed.

22 Claims, 9 Drawing Sheets

DIGITAL AUDIO PROCESSING

BACKGROUND OF THE INVENTION

1. Field of the Invention

This invention relates to digital audio processing.

2. Description of the Prior Art

Audible watermarking methods are used to protect an audio signal by combining it with another (watermark) signal for transmission or storage purposes, in such a way that the original signal is sufficiently clear to be identified and/or evaluated, but is not commercially usable in its watermarked form. To be worthwhile, the watermarking process should be secure against unauthorised attempts to remove the watermark.

The watermark signal may be selected so that it carries useful information (such as copyright, advertising or other identification data). It is a desirable feature of watermarking systems that the original signal can be restored fully from the watermarked signal without reference to the original source material, given the provision of suitable software and a decryption key.

EP-A-1 189 372 (Matsushita) discloses many techniques for protecting audio signals from misuse. In one technique, audio is compressed and encrypted before distribution to a user. The user needs a decryption key to access the audio. The key may be purchased by the user to access the audio. The audio cannot be sampled by a user until they have purchased the key. Other techniques embed an audible watermark in an audio signal to protect it. In one technique, an audio signal is combined with an audible watermark signal according to a predetermined rule. The watermark degrades the audio signal. The combination is compressed for transmission to a player. The player can decompress and reproduce the degraded audio signal allowing a user to determine whether they wish to buy a “key” which allows them to remove the watermark. The watermark is removed by adding to the decompressed degraded audio signal an equal and opposite audible signal. The watermark may be any signal which degrades the audio. The watermark may be noise. The watermark may be an announcement such as “This music is for sample playback”.

With a frequency-encoded (also referred to as “spectrally-encoded”) audio signal, for example a data-compressed signal such as an MP3 (MPEG-1 Layer III) signal, an ATRAC™ signal, a Phillips™ DCC™ signal or a Dolby™ AC-3™ Signal, the audio information is represented as a series of frequency bands. So-called psychoacoustical techniques are used to reduce the number of such bands which must be encoded in order to represent the audio signal.

The audible watermarking techniques described above do not apply to frequency-encoded audio signals. To apply—or to subsequently remove—an audible watermark, it is necessary to decode the frequency-encoded audio signal back to a reproducible form. However, each time the audio signal is encoded and decoded in a lossy system, it can suffer degradation.

SUMMARY OF THE INVENTION

This invention provides a method of processing a spectrally-encoded digital audio signal comprising band data components representing audio contributions in respective frequency bands, said method comprising the steps of altering a subset comprising one or more of said band data components to produce a band-altered digital audio signal having altered band data components; and generating recovery data to allow original values of said altered band data components to be reconstructed.

The basis of the present technique is the recognition that if spectral information is selectively removed from or distorted in a frequency-encoded audio file, a degree of the file’s original intelligibility and/or coherence is retained when the depleted file is subsequently decoded and played. The extent to which the quality of the original file is preserved depends on the number of frequency bands which are not removed, and the dominance of the removed bands in the context of the overall spectral content of the file. If a number of frequency components (or “lines”) from the original are not simply removed, but are replaced (or mixed) with data for the same frequency lines taken from an arbitrarily selected ‘watermark’ file (also frequency-encoded), then some of the intelligibility of both files is retained in the decoded output.

Accordingly audible watermarking can be achieved by substituting (or combining) some or all of the spectral bands of a file with equivalent bands from a similarly encoded watermark signal. This manipulation can be done without decoding either signal back to time-domain (audio sample) data. The original state of each modified spectral band is preferably encrypted and may be stored in the ancillary_data sections of frequency-encoded files (or elsewhere) for subsequent recovery.

Various other respective aspects and features of the invention are defined in the appended claims. Features of the independent and sub-claims may be combined in permutations other than those explicitly recited.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Although the embodiments below will be described in the context of an MP3 system, it will of course be understood that the techniques (and the invention) are not limited to MP3, but are applicable to other types of spectrally-encoded (frequency-encoded) audio files or streamed data, such as (though not exclusively) files or streamed data in the ATRAC™ format, the Phillips™ DCC™ format or the Dolby™ AC-3™ format.

Figure 1:
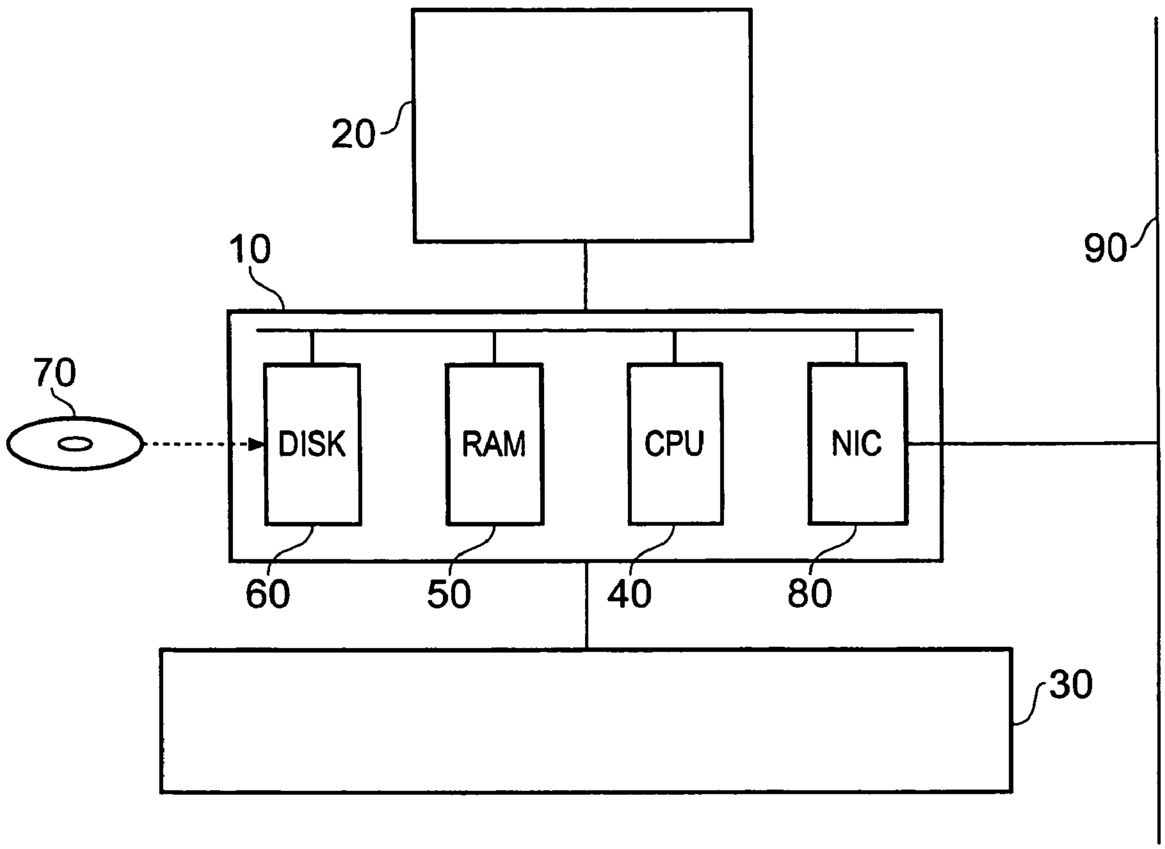
FIG. 1 is a schematic diagram of an audio data processing system.

FIG. 1 is a schematic diagram of an audio data processing system based on a software-controlled general purpose personal computer having a system unit 10, a display 20 and user input device(s) 30 such as a keyboard, mouse etc.

The system unit 10 comprises such components as a central processing unit (CPU) 40, random access memory (RAM) 50, disk storage 60 (for fixed and removable disks, such as a removable optical disk 70) and a network interface card (NIC) 80 providing a link to a network connection 90 such as an internet connection. The system may run software, in order to carry out some or all of the data processing operations described below, from a storage medium such as the fixed disk or the removable disk or via a transmission medium such as the network connection.

Figure 2:
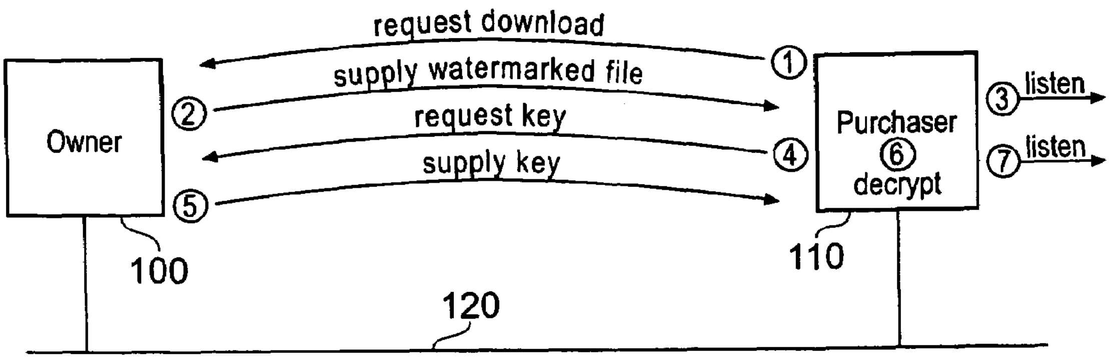
FIG. 2 is a schematic diagram illustrating a commercial use of the present embodiments.

FIG. 2 is a schematic diagram illustrating a commercial use of the embodiments to be described below. FIG. 2 shows two data processing systems 100, 110 connected by an internet connection 120. One of the data processing systems 100 is designated as the "Owner" of an MP3-compressed audio file, and the other 110 is designated as a prospective purchaser of the file.

At a first step 1, the purchaser requests a download or transfer of the audio file. At a second step 2, the owner transfers the file in a watermarked form to the purchaser. The purchaser listens (at a step 3) to the watermarked file. The watermarked version persuades the purchaser to buy the file, so at a step 4 the purchaser requests a key from the owner. This request may involve a financial transfer (such as a credit card payment) in favour of the owner.

At a step 5 the owner supplies a key to decrypt so-called recovery data within the audio file. The recovery data allows the removal of the watermark and the reconstruction of the file to its full quality (of course, as a compressed file its "full quality" may be a slight degradation from an original version, albeit that the degradation may not be perceptible aurally—either at all, or by a non-professional user). The purchaser decrypts the recovery data at a step 6, and at a step 7 listens to the non-watermarked file.

It is not necessary that all of the above steps are carried out over the network. For example, the purchaser could obtain the watermarked material (step 2) via, for example, a free compact disc attached to the front of a magazine. This avoids the need for steps 1 and 2 above.

Data Compression Using Frequency-Encoding

A set of encoding techniques for audio data compression involves splitting an audio signal into different frequency bands (using polyphase filters for example), transforming the different bands into frequency-domain data (using Fourier Transform-like methods), and then analysing the data in the frequency-domain, where the process can use psychoacoustic phenomena (such as adjacent-band-masking and noise-masking effects) to remove or quantise signal components without a large subjective degradation of the reconstructed audio signal.

The compression is obtained by the band-specific re-quantisation of the spectral data based on the results of the analysis. The final stage of the process is to pack the spectral data and associated data into a form that can be unpacked by a decoder. The re-quantisation process is not reversible, so the original audio cannot be exactly recovered from the compressed format and the compression is said to be 'lossy'. Decoders for a given standard unpack the spectral data from the coded bitstream, and effectively resynthesise (a version of) the original data by converting the spectral information back into time-domain samples.

The MPEG I & II Audio coding standard (Layer 3), often referred to as the "MP3" standard, follows the above general procedure. MP3 compressed data files are constructed from a number of independent frames, each frame consisting of 4 sections: header, side_info, main_data and ancillary_data. A full definition of the MP3 format is given in the ISO Standard 11172-3 MPEG-1 layer III.

Figure 3:
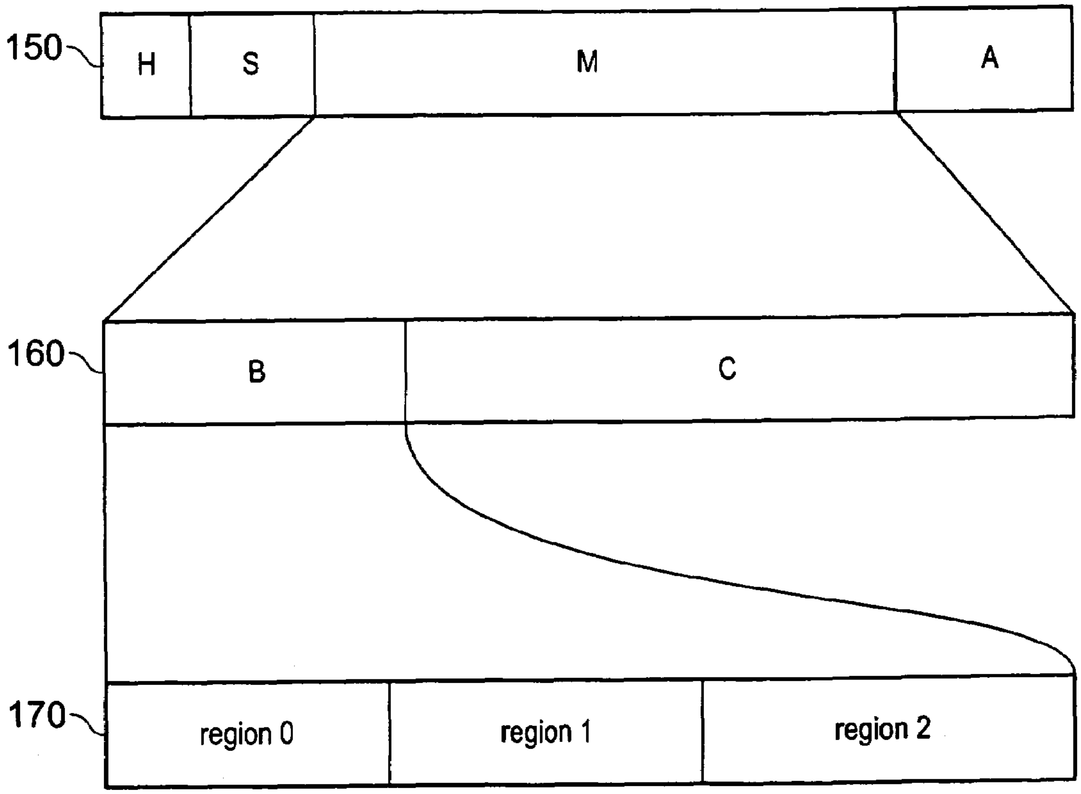
FIG. 3 schematically illustrates an MP3 frame.

The top section of FIG. 3 schematically illustrates the structure described above, with an MP3 frame 150 comprising a header (H), side_info (S), main_data (M) and ancillary_data (A).

The frame header contains general information about other data in the frame, such as the bit-rate, the sample-rate of the original data, the coding-level, stereo-data-organisation, etc. Although all frames are effectively independent, there are practical limits set on the extent to which this general data can change from frame-to-frame. The total length of each frame can always be derived from the information given in the frame header. The side_info section describes the organisation of the data in the following main_data section, and provides band scalefactors, lookup table indicators, etc.

The main_data section 160 is shown schematically in the second part of FIG. 3, and comprises big_value regions (B) and a Count_1 region (C). The main_data section gives the actual audio spectral information, organised into one of a number of several possible different groupings, determined from the header and side_info sections. Roughly speaking however, the data is presented as the quantised frequency band values in ascending frequency order. Some of them will be simple 1-bit fields (in the count_1 data subsection), indicating the absence of presence of data in particular frequency bands, and the sign of the data if present. Some of them will be implicitly zero (in the zero_data subsection) since there is no encoding information provided for them. There are three subdivisions of the main_data section known as the big_value regions. In these regions, spectral values are stored by the encoder as lookup values for Huffman tables. The Huffman coding serves only to further reduce the bit-rate by representing more frequently used spectral values by shorter codes.

The actual spectral value for any given frequency line in the big_value regions is determined by three different data:

- the Huffman code used for that spectral line [found in main_data]
- which Huffman table is in use, from a predetermined set of Huffman tables [found in side_info]
- what scalefactor is in use for that frequency line [found in side_info and main_data], (effectively a scaling coefficient for each line)

All three data may change from frame to frame.

The ancillary_data area is just the unused space following the main data area. Because there is no standardisation between encoders about how much data is held in the audio frame, the size of the audio data, and hence the size of the ancillary_data, can vary considerably from frame to frame. The size of the ancillary_data-section may be varied by more or less efficient packing of the preceding sections, by more or less severe quantisation of the spectral data, or by increasing or decreasing the nominal bit-rate for the file.

Watermarking Technique

An embodiment of the present technique will now be described with reference to the watermarking of an MP3 compressed audio file. It will be appreciated however that the technique can be applied to other spectrally encoding systems, with appropriate (routine) changes to the data format and organisation. Also, although the technique is by no means limited to this situation, it is assumed that the MP3 file—in the absence of a watermark—is of a sufficient quality (i.e. has sufficiently small degradation resulting from the compression process) that a user would be interested in removing the watermark to use the file.

For ease of description, it will also be assumed in this example that the initial format of watermark and source file are similar (same sample-rate, MPEG version and layer, stereo encoding and short/long block utilisation). Again, this is not a requirement of the procedure.

In the present technique, audible watermarking is achieved by substituting (or combining) some or all of the spectral bands of a file with equivalent bands from a similarly encoded watermark signal. This manipulation can be done at the MP3-encoded level (or at the post-Huffman-lookup level), by manipulation of the encoded bitstream, i.e. without decoding either signal back to time-domain (audio sample) data. The original state of each modified spectral band is encrypted and stored in the ancillary_data sections of MP3 files for subsequent recovery. Space for this may be made by extending the ancillary_data section, or using existing space. There is therefore no requirement to fully-decode and then re-encode the audio data, and so further degradation of the audio signal (through a decoding and re-encoding process) can be avoided.

In this description the following terminology will be used:

source file=MP3 file containing audio material to which a watermark is to be applied watermark file=MP3 file containing audible watermark signal.

A policy for which frequency lines are to be replaced is set. This may be simply to use a fixed set of lines, or to vary the lines according to the content of the source file and watermark files. In a first example, a simple fixed set of lines is chosen, with alternative policy methods being described afterwards.

Depending on which policy is selected, the amount of ancillary_data space required to store the recovery data can be determined at this time. As mentioned above, this can be made available simply by increasing the output bit-rate of the watermarked data. In most situations, simply increasing the bit-rate to the next higher legal value (and using that to limit the amount of recovery data that can be saved) is an adequate measure. For variable bit-rate encoding schemes, it is possible to tune the change in bit-rate more finely.

MP3 encoders generally seek to minimise the free space in each frame, and a good or ideal encoder will have zero space in the ancillary_data region. To establish whether there is any useful space available to frames requires an analysis of the frame header(s).

The amount of data space which might be needed in a frame, to allow for the encrypted recovery data, is flexible but at a minimum a few bytes per frame are generally needed to carry the recovery header information. The data capacity needed to carry recovery data for the spectral lines which have been modified is dependant on the number and nature of the modified lines. Typically, in empirical trials of the techniques; this has been about 100 bytes per frame when watermarking material at an initial bit-rate of 128 kbit/s, but this figure has in turn been governed by (i.e. set in response to) a bit-rate increase from 128 kbit/s to 160 kbit/s which gives an increased data frame size of about 100 bytes—see below for a calculation demonstrating this.

There is a formula for the number of bytes per data frame 'bpf', of which the overall bit-rate 'B' is a variable. The audio sample rate 'SR' is the other variable. This formula is for MPEG 1 layer 3:

$$bpf=144*B/SR$$

Bit-rate in a "normal" (i.e. a non-VBR 'variable bit rate') MP3 file can have one of only a few legal values. For example, for MPEG-1 layer 3 these legal values are: 32, 40, 48, 56, 64, 80, 96, 112, 128, 160, 192, 224, 256 or 320 kilobits/s).

So for a file at an audio sample rate 44.1 kHz, if the bit-rate is increased from 128 kbit/s to 160 kbit/s the extra capacity provided by this measure would be:

$$144*(160{,}000-128{,}000)/44100=\text{about } 104.5 \text{ bytes per frame.}$$

Figure 4A:
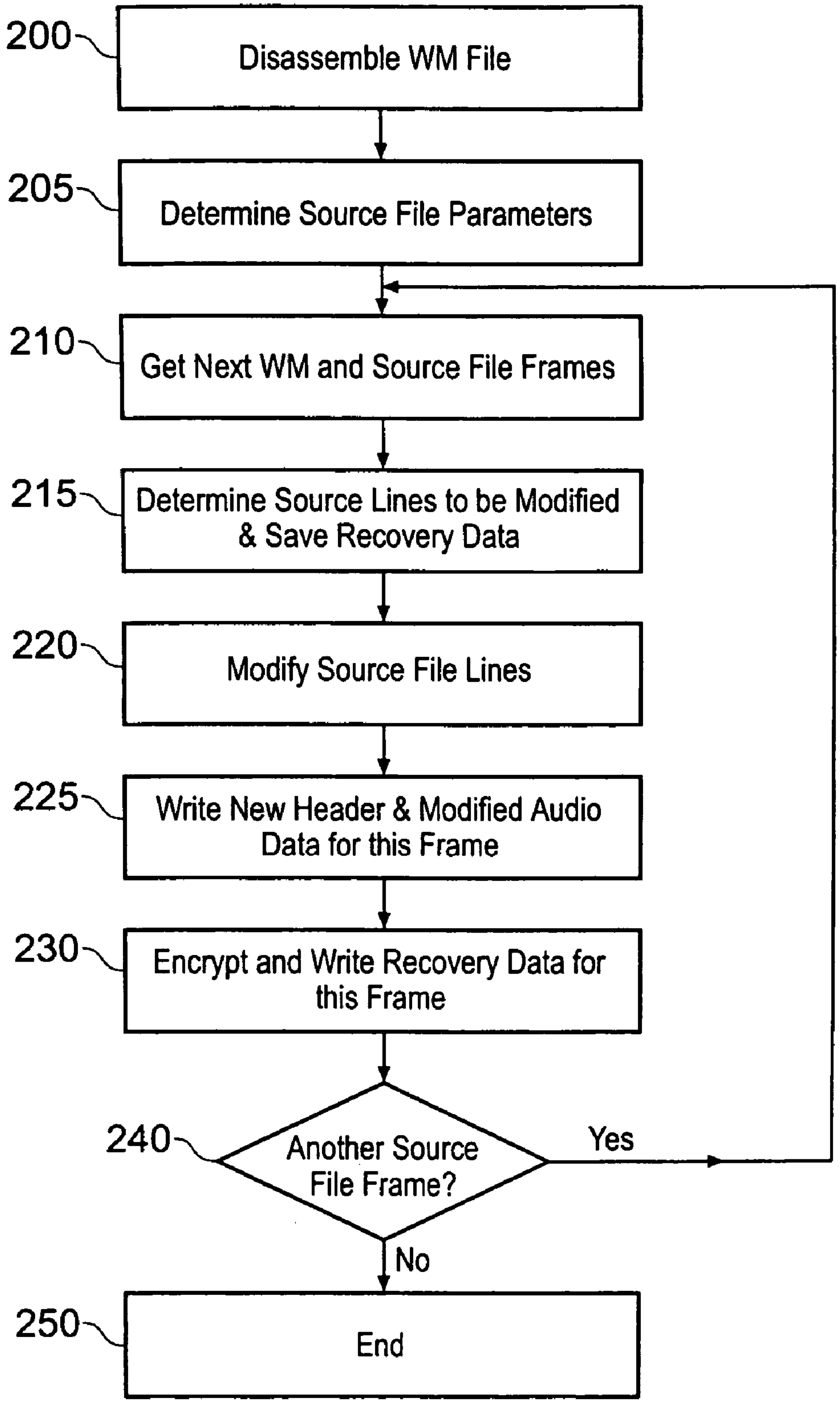
FIG. 4*a* is a schematic flow-chart illustrating steps in applying a watermark to a source file.

Moving to a higher bit-rate is considered to be very useful, because it is difficult without detailed analysis, to guarantee that ancillary data can be appended to the main_data in any given audio frame, while keeping the bit-rate the same. This is because of the so-called 'bit reservoir'—where an audio frame can, at the discretion of the encoder, span up to three data frames. If the audio frame is extended (by appending an ancillary region, by changing the main_data vales, or any other way) it may have multiple knock-on effects which make it impossible for later frames to fit into their available space. The basic process is schematically illustrated in the flow chart of FIG. 4*a*.

At a step 200 the watermark is read into memory and disassembled (frame by frame, or in its entirety). The spectral information from the watermark which is required by the watermarking policy is stored. It is convenient at this stage to refer back to the relevant Huffman table and other associated information (e.g. scaling factor) so that the actual spectral value is available.

At a step 205 the initial source frame header(s) (and possibly a few initial frames) are read to establish the frame format, the recovery data space available and so on. A looped process now starts (from a step 210 to a step 240) which applies to each source file frame in turn.

At a step 210 the next source file frame and the next watermark file frame are read. At a step 215, the spectral lines to be modified are determined in accordance with the current policy, and the spectral information for frequency lines of the source file frame relevant to the policy is saved in a recovery area (e.g. a portion of the RAM 50).

The current frame of the watermark is then applied to the current source file frame at a step 220. So, as this step is repeated in the loop arrangement, a first frame of the watermark file is applied to a first frame of the source file, and so on. If the watermark has fewer frames than the source file, the sequence of watermarking frames is repeated.

The original value for each spectral line determined by the policy is modified by one of two possible methods:

with reference to the corresponding frame in sequence from the watermark, the value is replaced by the value of that line in the watermark, possibly multiplied or otherwise modified by a scaling factor k (which in a generalised case could be one or could be zero, as well as the possibility of k being a value other than one or zero. The scaling factor may be variable, in which case it can be stored with the recovery data, or it could be fixed, at least in respect of a particular source file, in which case it could be either implied or stored just once for that file), or the value is combined with the relevant value from the watermark—for example, a 50:50 averaging process.

Both of these methods operate most successfully when the spectral value used to replace the original may be derived from the same Huffman table as that in use for the original line. If the table does not contain the exact value required by the replacement, then the Huffman code which returns the nearest value is used. In both cases, the scalefactors in effect for each line may also be taken into account when determining the replacement value.

At a step 225, the modified frame data for each frame, including modified header information, is stored (for example, in the disk storage 60) once the watermark has been applied. The recovery data applicable to that frame is encrypted and stored at a step 230.

The frame header may be modified at the step 225 so that the bit-rate is increased, to the extent that provision is made for the extra space required to apply watermarking to the existing audio frame, and to append the recovery data (as saved in the step 215) to the audio frame's main_data region as ancillary_data. The first thing to be written is organisational data, such as which spectral bands are being saved, and possible UMID (SMPTE Universal Material Identifier) or metadata information, and then the actual saved bands. An extra consideration here is that the data must be encrypted to prevent unwarranted restoration of the original; a conventional key-based software encryption technique is used.

Figure 6A:
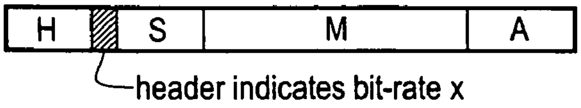
FIGS. 6*a* and 6*b* schematically illustrate a bit-rate alteration.
Figure 6B:
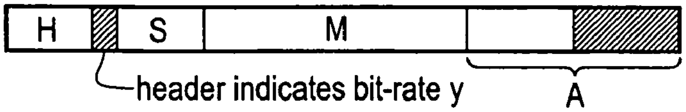

The process of altering the header data to increase the available data capacity in order to store the recovery data is schematically illustrated in FIGS. 6*a* and 6*b*. In FIG. 6*a* the header specifies a certain bit-rate, which in turn determines the size of each frame. In FIG. 6*b* the header has been altered to a higher legal value (e.g. the next higher legal value). This gives a larger frame size. As the size of the header, side_info and main_data portions has not increased, the size of the ancillary_data area has increased by the full amount of the change in frame size.

Figure 5A:
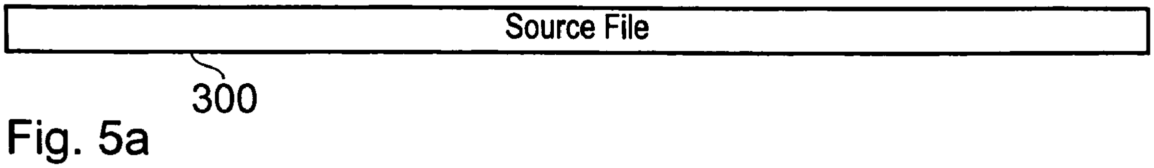
FIGS. 5*a* to 5*c* schematically illustrate the application of a watermark to a source file.
Figure 5B:
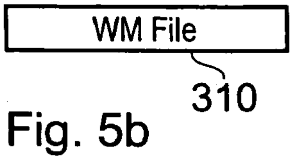
Figure 5C:
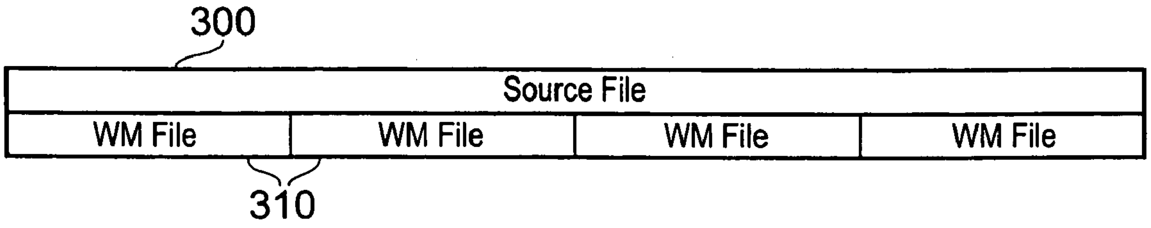

At a step 240 a detection is made of whether all of the source file has been processed. If not, steps 210 to 240 are repeated, re-using the watermark file as many times as necessary, until the whole source file has been processed. This process is illustrated schematically in FIGS. 5*a* to 5*c*, in which a watermark file 310 is shorter than a source file 300. The watermark file 310 is repeated as many times as are necessary to allow the application of the watermark to the entire source file.

If however all of the source file has been processed, the flow-chart ends in respect of that file at a step 250.

The watermarked file, including the modified spectral line data and the encrypted recovery data, is stored, for example to the disk 60, and/or transmitted via the network 90.

In the above method, it will be appreciated that the modification may take place on an audio-frame basis. The MP3 standard allows audio frames to span multiple data frames.

Figure 4B:
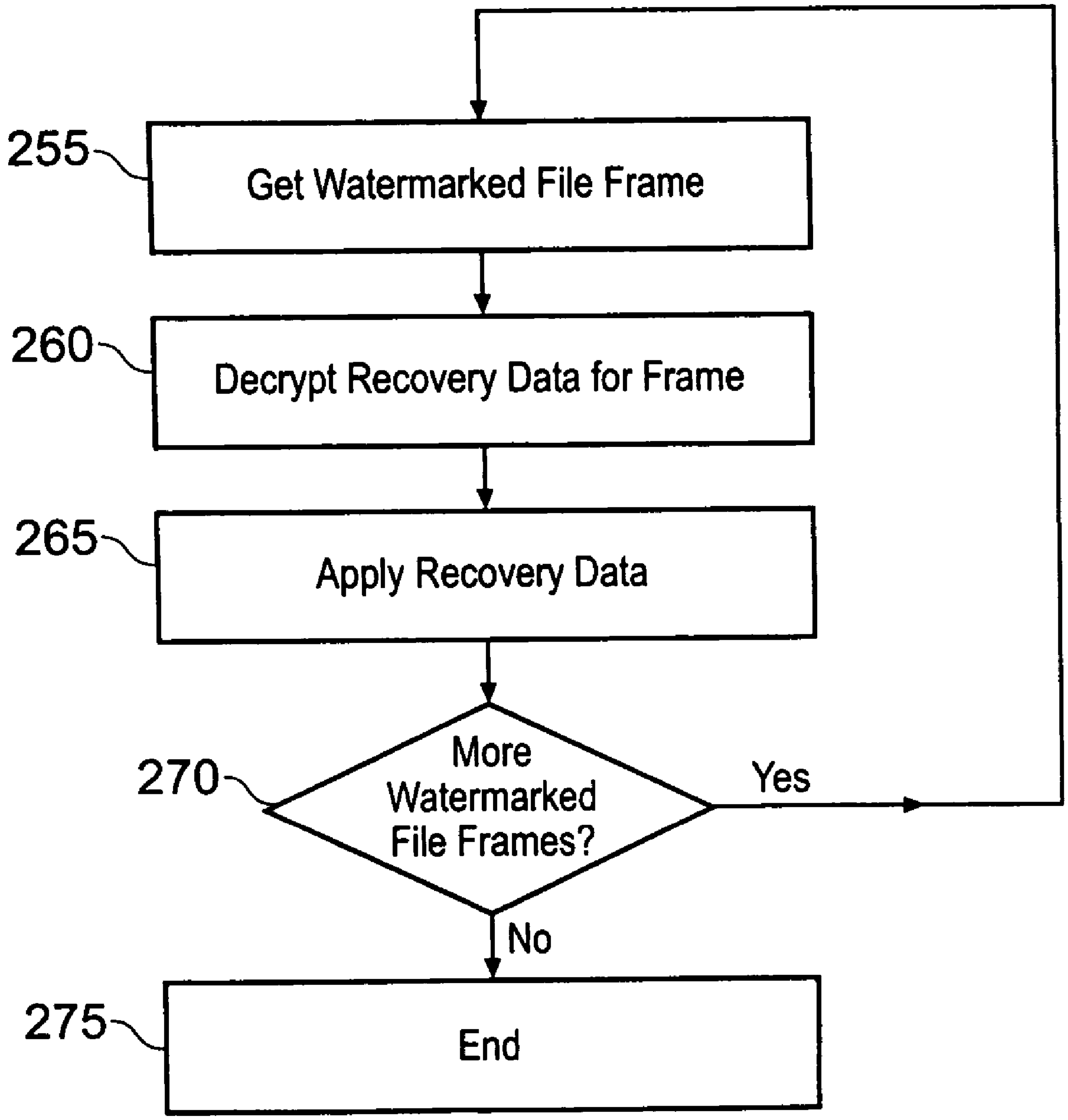
FIG. 4*b* is a schematic flow chart illustrating steps in removing a watermark from a watermarked file.

FIG. 4*b* schematically illustrates steps in the removal of a watermark from a watermarked file.

At a step 255, a frame of the watermarked file is loaded (for example into the RAM of FIG. 1). At a step 260, the recovery data relevant to that frame is decrypted, using a key as described above. At a step 265, the recovery data is applied to that watermarked file frame to reconstruct the corresponding source file frame including header and audio data. The term "applied" signifies that a process is used which is effectively the inverse of the process by which the watermark was first applied to the source file. Actually the process is potentially much simpler that the application of the watermark, in that at the recovery stage there is no need to set a policy, no band selection etc. For each frame:

a. decrypt recovery info (the first datum of which may be an encrypted 'length' field)

b. analyse policy part of the recovery data to see what has to be put back in its proper place. Some of this may be constant for all frames and may perhaps only be specified in the first frame for non-streaming washing (e.g. the policy itself); some may change from frame to frame—like the actual spectral information—(which can depend on policy). Streaming recovery implies that the recovery data preferably includes the policy for all frames.

c. overwrite or correct the altered data in the frame with its (original) value using the recovery data.

d. write the new frame header (setting original frame rate again), side_info and main_data, but not the recovery data As with the watermarking process, the above may be complicated by the fact that audio framing is not necessarily in a 1:1 relationship with the data-frame, so some buffering may be required before a data-frame can be released.

Note that (as with the watermarking procedure), the restoration of the original material can be accomplished without having to decode the data down to the time-domain data (audio sample) level.

If, at a step 270, there are further watermarked frames to be handled, control returns to the step 255. Otherwise, the process ends 275.

Variants

The general procedure described above can be modified in several ways. The following description gives a number of variants, which may be used to modify the general procedure, either individually or in combination.

1. Methods for Selecting Replacement Frequency Lines

Figure 7A:
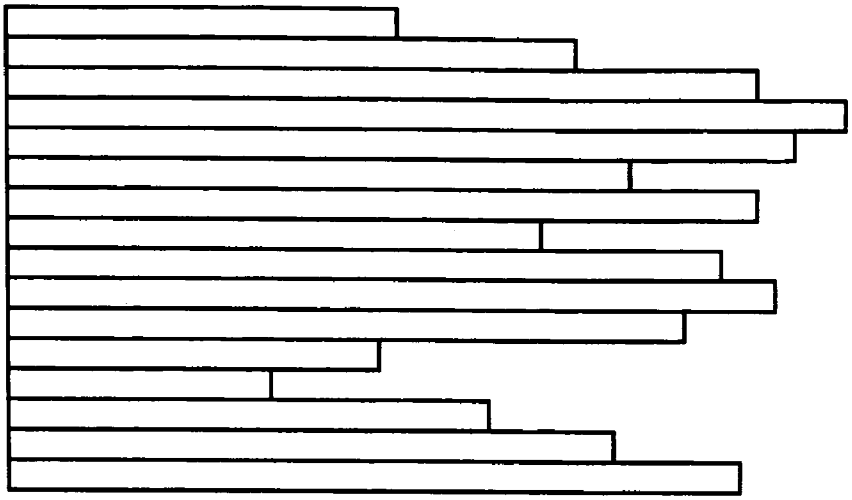
FIGS. 7*a* to 7*c* schematically illustrate the replacement of source file frequency lines.
Figure 7B:
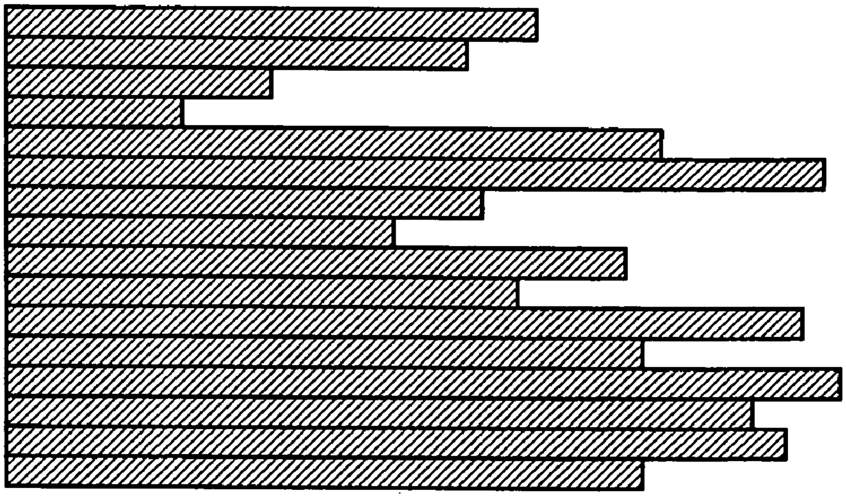
Figure 7C:
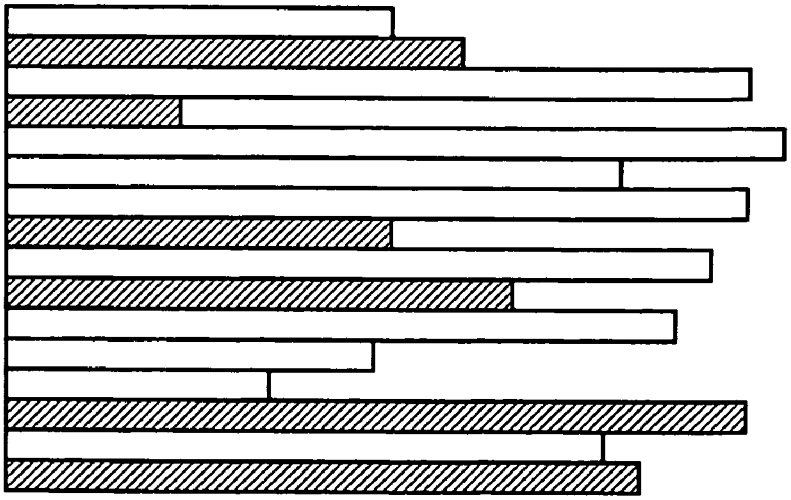

In the general procedure, the method described used a simple fixed set of frequency lines to be modified. This process is illustrated schematically in FIGS. 7*a* to 7*c*. FIG. 7*a* schematically illustrates a group of 16 frequency lines of one frame of a source file. FIG. 7*b* schematically illustrates a corresponding group of 16 lines from a corresponding frame of a watermark file. The watermark file lines are drawn with shading. In FIG. 7*c*, the $2^{nd}$, $4^{th}$, $8^{th}$, $10^{th}$, $14^{th}$ and $16^{th}$ lines (numbered from the top of the diagram) of the source file have been replaced by corresponding lines of the watermark files according to a predetermined (fixed) replacement policy.

Alternative methods which are sensitive to the nature of the material in use can potentially give better (e.g. more subjectively intelligible) results. Three examples (1.1 to 1.3) are given:

EXAMPLE 1.1

The spectral lines to be modified are selected by analysis of the watermark. As the watermark is disassembled at the step 200, the spectral information is examined, and a weighting table is built according to which frequency lines are dominant in each frame. When all the watermark frames have been read, the set of spectral lines most frequently dominant (averaged across the whole watermark file) are used for watermarking all frames, taking into account the source file frame's available space.

EXAMPLE 1.2

Figure 8A:
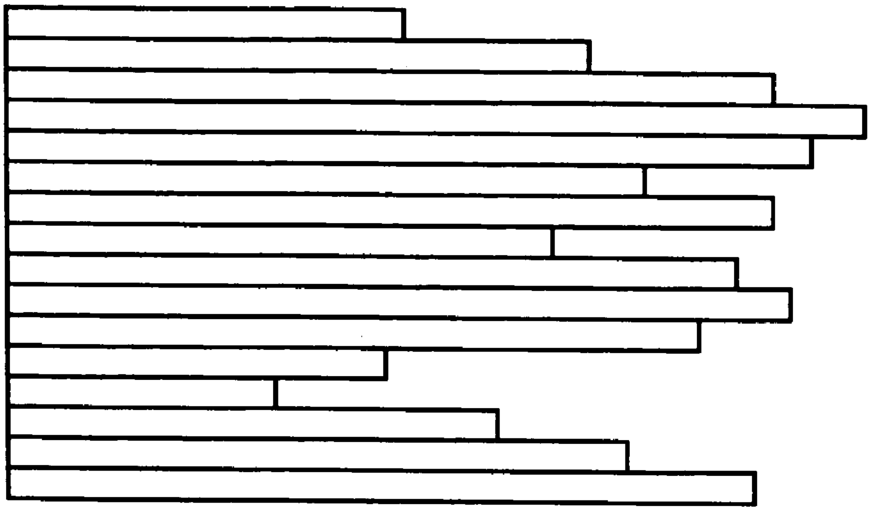
FIGS. 8*a* to 8*c* schematically illustrate the replacement of source file frequency lines by most significant watermark frequency lines.
Figure 8B:
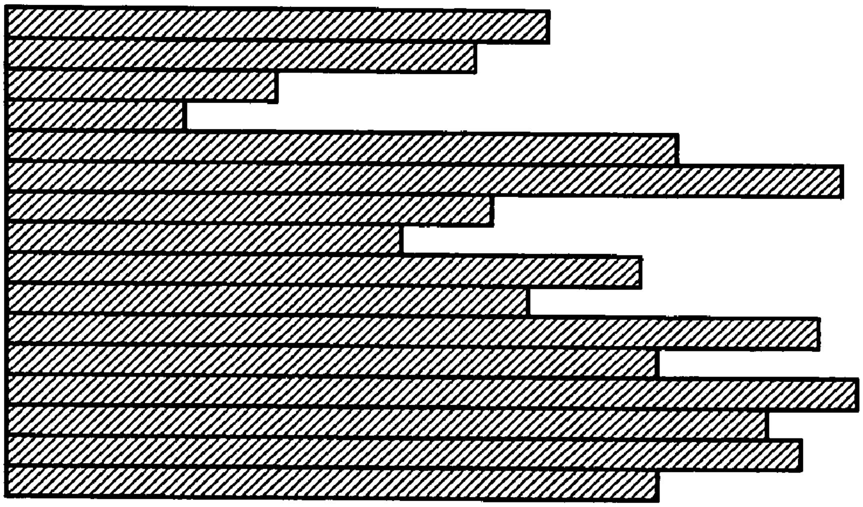
Figure 8C:
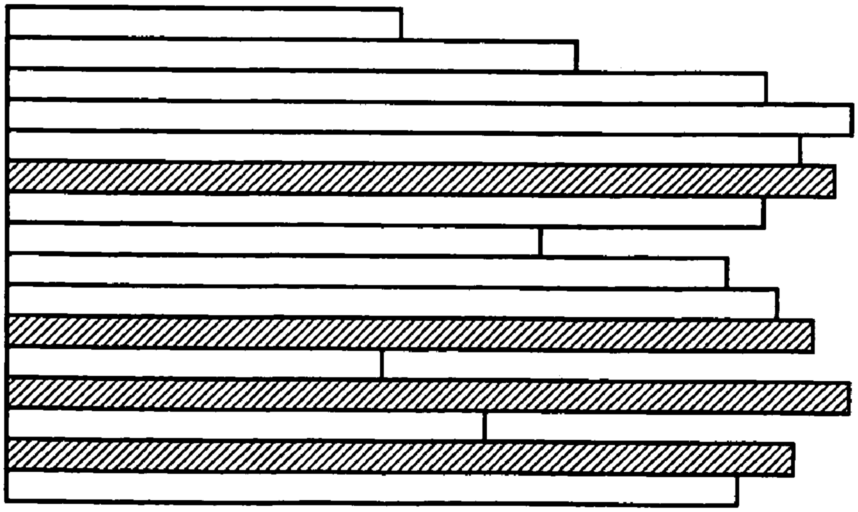

The source file lines to be modified vary from frame to frame, based on the dominant lines in each watermark frame. A frequency-line table sorted by magnitude is created for each watermark frame. As each source file frame is processed, the frequency lines modified are selected to be those which are most dominant in the current watermark frame. This process is illustrated schematically in FIGS. 8*a* to 8*c*. As before, FIG. 8*a* schematically illustrates a group of 16 frequency lines of one frame of a source file and FIG. 8*b* schematically illustrates a corresponding group of 16 lines from a corresponding frame of a watermark file. The most significant lines (in FIG. 8*b*, the longest lines) of the watermark frame are substituted into the source file, to give a result shown schematically in FIG. 8*c*. It will be noted that only four lines have been substituted. This is to illustrate an adaptive substitution process to be described under Example 1.4 below.

EXAMPLE 1.3

Figure 9A:
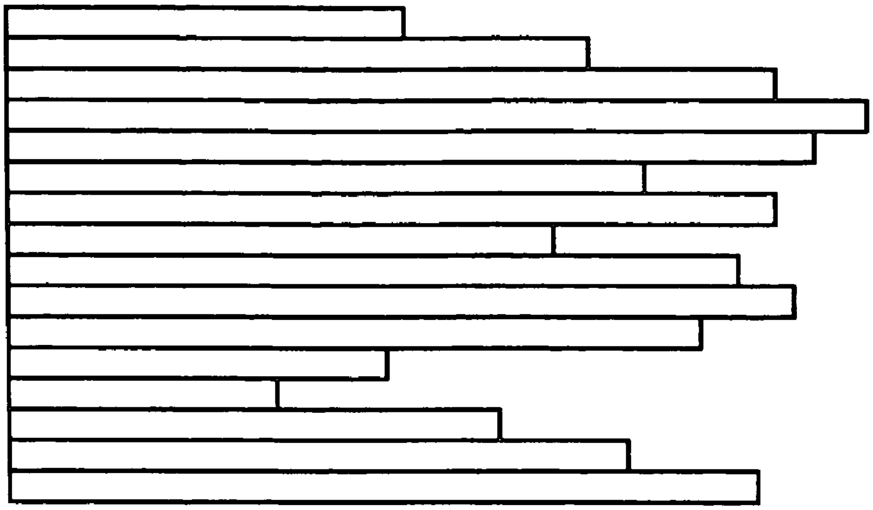
FIGS. 9*a* to 9*c* schematically illustrate the detection of a distance between source file and watermark file frequency lines.
Figure 9B:
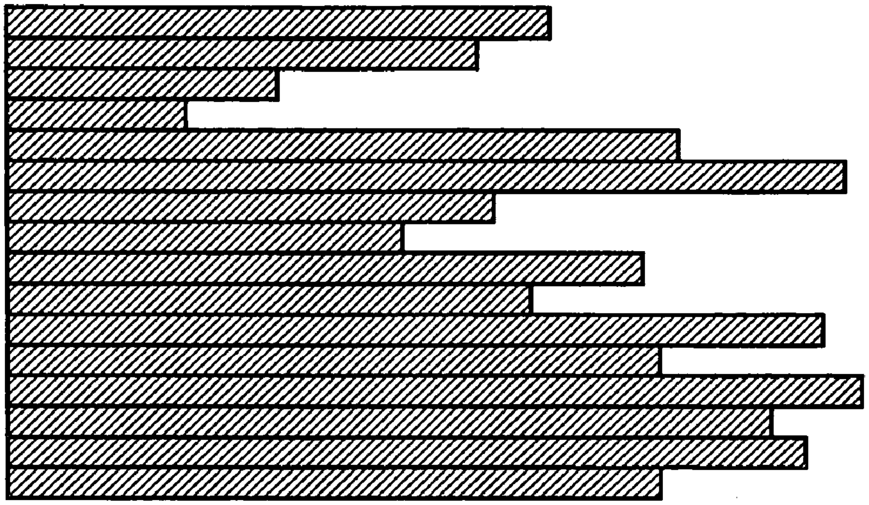
Figure 9C:
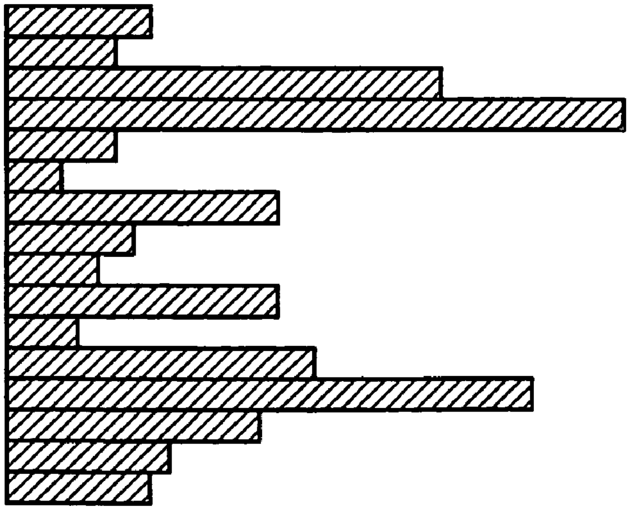

The source file lines to be modified are based on a combination of the spectral data in the watermark and source file. An example is to calculate a weighting based on the difference between the possible pre-watermarked and post-watermarked lines, and select the lines which give the highest score (i.e. a higher separation gives rise to more degradation of the source file by the watermark). This reduces the possibility that the source file Huffman lookup table might not accommodate the watermark's value. Again, this process is illustrated schematically in FIGS. 9*a* to 9*c*. FIG. 9*a* schematically illustrates a group of 16 frequency lines of one frame of a source file and FIG. 9*b* schematically illustrates a corresponding group of 16 lines from a corresponding frame of a watermark file. FIG. 9*c* schematically represents the "distance" (the difference in length in this schematic representation) between corresponding lines of the two frames. Depending on how many lines can be accommodated in the current policy, the n lines having the largest distance will be substituted.

EXAMPLE 1.4

Pseudo-random selection: the identity of lines to be scaled could alternatively be derived in accordance with a pseudo-random order, seeded by a seed value. The seed value could be part of the recovery data for the whole file or could be derivable from the decryption key.

All of the techniques described above—the basic technique and the variants in examples 1.1 to 1.4—can apply to schemes whereby a source file line is replaced by a watermark file line or a source file line is altered in dependence on a watermark file line, or even a combination strategy. In the basic scheme with a fixed policy, it is not necessary to store details with every frame of which lines have been altered. With the more adaptive policies, a straightforward way of identifying which lines have been altered is to store this information with the recovery data. Indeed, if the recovery data—when decrypted—identifies the lines for which recovery information is provided, then such details are implied.

EXAMPLE 1.5

Adapting the number of lines altered. It is not necessary that a predetermined or fixed number of lines is altered. Even a fixed line policy (the basic arrangement described earlier) can allow for a varying number of lines to be altered in each frame. the policies can alter a varying number of lines in accordance with an order of preference (and possibly subject to a maximum number of alterations being allowed). At the step 210 (FIG. 4*a*) the amount of spare space in the ancillary_data section can be detected. A number of lines is selected for alteration so that the necessary recovery data will fit into the available space in ancillary_data. If the ancillary_data space is to be increased by altering the overall bit-rate of the file, this increase is taken into account.

In examples 1.2 and 1.3 above, the frequency lines to be modified are likely to change from frame-to-frame. If the rate of change of the selected bands is too great, audible side-effects can result. These can be reduced by subjecting the results of the relevant weighting procedure to low-pass filtering—in other words, restricting the amount of change from frame to frame which is allowed for the set of spectral lines to be modified. Undesirable side-effects may also occur if the frequency lines modified represent too high an audio frequency. To alleviate this potential problem the audio frequency represented by the modified frequency lines can be limited.

Similarly, if the watermark and source file frequency lines are within short or long blocks then it is not valid to substitute them directly. Either some further decoding and re-encoding could occur, or the substitution could be the same code as in the original source file. In this regard it is noted that MP3 files can store spectral information according to two different MDCT (modified discrete cosine transform) block lengths for transforming between time and frequency domains. A so-called 'long block' is made up of 18 samples, and a 'short block' is made up of 6 samples. The purpose of having two block sizes is to optimise or at least improve the transform for either time resolution of frequency resolution. A short block has good time resolution but poor frequency resolution, and for a long block it is vice-versa. Because the MDCT transform is different for the two block sizes, a set of coefficients (i.e. frequency lines) from one type of block cannot be substituted directly into a block of a different type.

Also, undesirable results may occur if the stereo encoding mode of the watermark differs from the stereo encoding mode of the source file. In such cases some further decoding and re-encoding of the watermark could be used.

In all three examples 1.1 to 1.5, the number of source file frequency lines modified in the watermarking process may be limited by a fixed number, (policy-driven, user-supplied or hard-coded), or may be limited by the available recovery space, or both. Which method is most suitable (including the simple fixed-line method) will depend on a number of factors, including available processing power, the nature of source file and watermark, and the degree of degradation of the source file (by the watermark) which is required.

2. Changing Huffman Tables and Scalefactors

The above descriptions only refer to the modification (and recovery storage) of the main_data spectral information. It is also possible to modify other aspects of the original data, such as the Huffman tables in use for the spectral data of specific frequency lines. This would be done in order to ensure that exact codes were available for the modified spectral data (and not just codes which gave approximate post-lookup values).

Similarly, the scalefactors in the side_info and main_data sections may be changed to better represent the spectral levels of the watermark spectral data. This might be useful (for example) to reduce a potential undesirable effect whereby the level of the watermark in the watermarked material tends to follow the level in the source file material.

3. Methods for Saving Recovery Data

As described above, the preferred method for hiding recovery data is to use the ancillary_data space in each audio frame. This can be achieved by using existing space, or by increasing the bit-rate to create extra space. This method has the advantage that the stored recovery data is located in the frame that it relates to, and each frame can be restored without reference to other frames. Other mechanisms are possible however:

The MP3 format allows for special ID frames to be part of the file, usually at the start or end of the file. These could be used to store information about the watermarking operation which are common to all frames, such as UMID and metadata information, watermarking strategy, fixed watermark masks, etc.

The recovery data can be simply appended to the MP3 file in blocks of data (not necessarily in the MP3 format).

4. Use of Frequency Lines Not in the Big Value Regions 4.1 Using the Watermark's Count_1 Region: The above methods generally refer to the spectral data in the big_value regions of the main_data section as the targets for watermark modification. Spectral data for watermark and source file is also stored in the count_1 region of their respective main_data sections. Data from this region could also be used for watermarking, and could enhance the watermarked-file quality where (for example) the watermark has significant spectral information in the count_1 region.

4.2 Redefining the source file's region boundaries: The source file may be able to more easily accommodate the watermark by extending the length of any (or all) of the source file's big_value regions or the source file's count_1 regions. For example, the watermark may have a frequency line in the big_value region which corresponds to a frequency line in the source file frame's count_1 region. Or, the watermark may have a frequency line the count_1 region which corresponds to a frequency line in the source file frame's zero region. This option would require further recovery information, for example, to take into account the change in the region boundaries.

5. File vs. Streaming

The above descriptions have generally assumed that the input and output of the watermarking system have been MP3 files. Extensions or alterations to the system could allow for streaming data to be handled, for example in a broadcast situation (where it is unlikely that the process would have access to either the start or end of the data stream). So, although the above examples refer to "files", the same techniques should be considered as applicable to audio "signals" in general, which could be streaming signals.

This would involve making sure that each frame contained all the recovery data necessary to restore itself, including all modification line policy information and a description or definition of the lines used for (modified by) watermarking, and methods for ensuring that the decryption key for the recovery data was either the same for all frames, or could be calculated from the data in each frame, (perhaps making use of a public-key encryption system for the key itself). It would also involve taking into account the variability in the data frame size due to pad bits. The frame size varies in order to maintain a constant average bit-rate per frame.

6. Fixed Tone Watermarks

The above descriptions have assumed that the watermark signal is taken from a watermark file, which is repeated as often as necessary to match the length of the source file.

Alternatives to this scheme allow for the watermark spectral data to be generated directly from fixed tones, noise sources or other cyclic or repetitive signal generators, which could be arbitrarily complex, and controlled in such a way as to match the content of the source file signal, but be modulated in such a way as to make unauthorised removal more difficult.

This approach might be useful when (for example) automatic impairment of the source file data was required for archiving purposes, but no specific watermark content was required. Other related techniques are described in examples 7.1 and 7.2 below.

7. Interleaving of Spectral Lines

Instead of using spectral lines from a watermark file to modify or substitute for lines in the source file, an interleaving approach can be used.

In this approach, lines of the source file are interchanged, scaled or deleted without reference to a separate watermark file or directly generated signal. Data required to recover the original state of the source file is stored as recovery data. The lines which are interchanged, scaled or deleted can change from frame to frame or at other intervals. The lines to be treated by any of the example techniques 7.1 and 7.2 can be selected by any of the policies described above. The techniques 7.1 and 7.2 could be applied in combination.

EXAMPLE 7.1

Interleaving/interchanging: In one arrangement, groups of lines are interchanged in the source file. The recovery data relevant to this arrangement need only identify the lines, and so can be relatively small. The interchanging of lines could alternatively be carried out in accordance with a pseudo-random order, seeded by a seed value. In this instance, the seed value could constitute the recovery data for the whole file and the decryption key. The interleaving/interchanging of spectral lines does not need to be limited to taking place within a single frame. It could take place between frames (e.g. across consecutive frames).

Figure 11A:
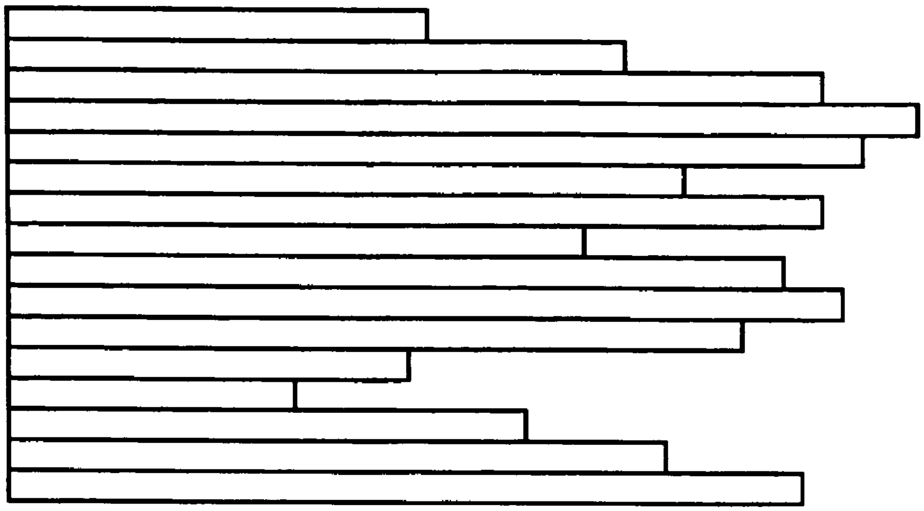
FIGS. 11*a* and 11*b* schematically illustrate the interchanging of source file frequency lines.
Figure 11B:
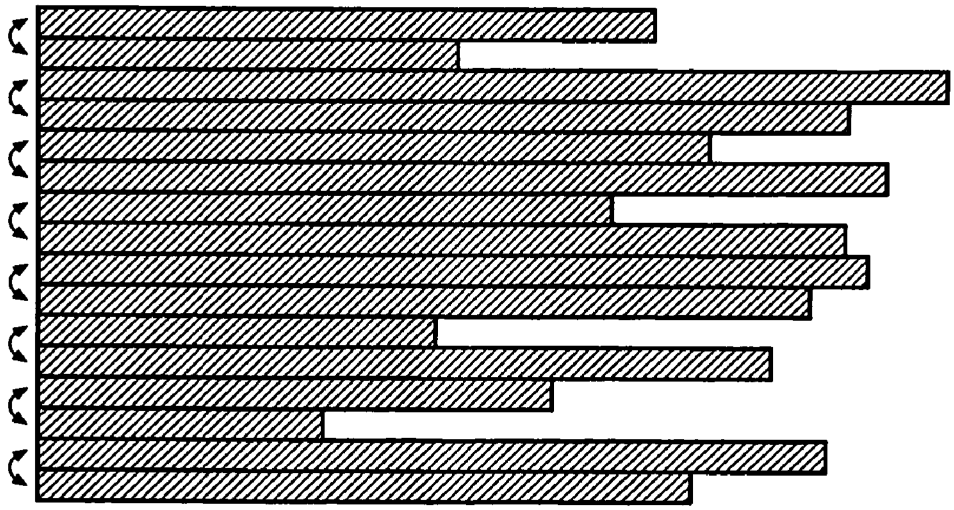

An example of this technique is illustrated schematically in FIGS. 11*a* and 11*b*. As before, FIG. 11*a* schematically illustrates a group of 16 frequency lines of one frame of a source file. FIG. 11*b* schematically illustrates a corresponding group of 16 lines from a corresponding frame of the watermarked file. The lines have been interchanged in adjacent pairs, so that the $1^{st}$ and $2^{nd}$ lines (numbered from the top of the diagram), the $3^{rd}$ and $4^{th}$ lines, the $5^{th}$ and $6^{th}$ lines (and so on) of the source file have been interchanged. This is a simple example for clarity of the diagram. Of course, a more complex interchanging strategy could be adopted to make it harder to recover the file without the appropriate key.

EXAMPLE 7.2

Deletion: In this arrangement, selected spectral lines of the source file are deleted. The recovery data relevant to this arrangement needs to provide the deleted lines.

8. Multiple Levels

Two or more levels or sets of recovery data can be provided, for example being accessible by different respective keys. A first level may allow any watermark message (e.g. a spoken message) to be removed, but leave a residual level of noise (degradation) which renders the material unsuitable for professional or high-fidelity use. A second level may allow the removal of this noise. It would be envisaged that the user would be charged a higher price for the second level key, and/or that availability of the second level key may be restricted to certain classes of user, for example professional users.

9. Partial Recovery

The user could pay a particular fee to enable the recovery of a certain time period (e.g. the 60 seconds between timecode 01:30:45:00 and 01:31:44:29). This requires an additional step of detecting the time period for which the user has paid, and applying the recovery data only in respect of that period.

Another way of modifying the above procedures to such partial recovery is:

during watermarking, individual frames (or groups of frames) have their recovery data encrypted with a predictable sequence of different keys during washing, only the frames which span the required segment are washed (recovered). These may be written:

a. to a separate file, at the original bit-rate b. as a washed segment embedded in the watermarked file, in which case all frames will be at the increased bitrate (as having a section of the file at a different bitrate is contrary to recommended practice).

Applications

Figure 10A:
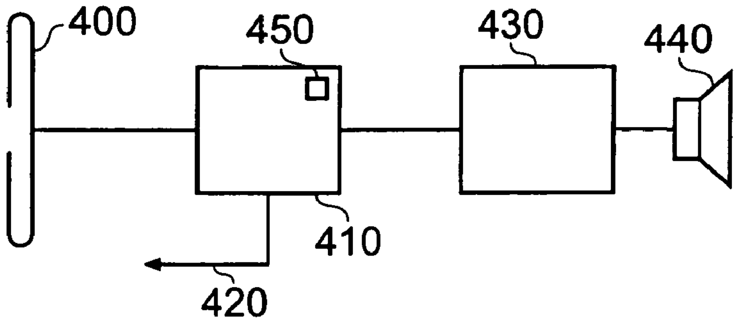
FIGS. 10*a* and 10*b* schematically illustrate apparatus for receiving and using watermarked data.

FIG. 10*a* schematically illustrates an arrangement for receiving and using watermarked files. Digital broadcast data signals are received by an antenna 400 (such as a digital audio broadcasting antenna or a satellite dish antenna) or from a cable connection (not shown) and are passed to a "set-top box" (STB) 410. The term "set-top box" is a generic term which refers to a demodulator and/or decoder and/or decrypter unit for handling broadcast or cable signals. The term does not in fact signify that the STB has to placed literally on top of a television or other set, nor that the "set" has to be a television set.

The STB has a telephone (modem) connection 420 with a content provider (not shown, but analogous to the "owner" 100 of FIG. 2). The content provider transmits watermarked audio files which are deliberately degraded by the application of an audible watermark as described above. The STB decodes these signals to a "baseband" (analogue) format which can be amplified by a television set, radio set or amplifier 430 and output via a loudspeaker 440.

In operation, the user receives watermarked audio content and listens to it. If the user decides to purchase the non-watermarked version, the user could (for example) press a "pay" button 450 on the STB 410 or on a remote commander device (not shown). If the user has an established account (payment method) with the content provider, then the STB simply transmits a request to the content provider via the telephone connection 420 and in turn receives a decryption key 420 to allow the recovery data to be decrypted and applied to the watermarked file as described above. In the absence of an established payment method, the user might, for example, enter (type or swipe) a credit card number to the STB 410 which can be transmitted to the content provider in respect of that transaction.

Depending on the arrangements made by the content provider, the user could be purchasing the right to listen to the non-watermarked content once only, or as many times as the user likes, or a limited number of times.

Figure 10B:
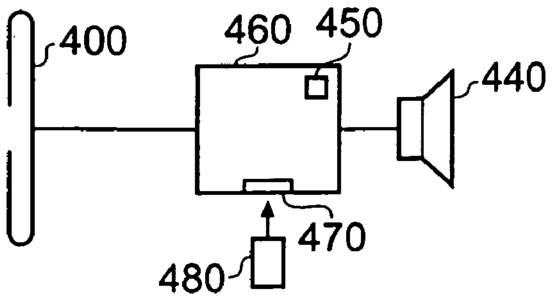

A second arrangement is shown in FIG. 10*b*, in which a receiver 460 comprises at least a demodulator, decoder, decrypter and audio amplifier to allow watermarked audio data from the antenna 400 (or from a cable connection) to be handled. The receiver also has a "smart card" reader 470, into which a smart card 480 can be applied. In common with other current broadcast services, the smart card defines a set of content services which the user is entitled to receive. This may be dependant on a set of services covered by a payment arrangement set up between the user and either a content provider or a broadcaster.

The content provider broadcasts watermarked audio content, as described above. This may be received and listened to (in a watermarked, i.e. degraded form) by anyone with a suitable receiver, so encouraging users to make arrangements to pay to receive the material in a non-watermarked form. Those users having a smart card giving permission to listen to the content can also decrypt the recovery data and listen to the content in non-watermarked form. For example, the decryption key could be stored on the smart card, to save the need for the telephone connection.

The smart card and the telephone-payment arrangements are of course interchangeable between the embodiments of FIGS. 10*a* and 10*b*. A combination of the two can also be used, so that the user has a smart card allowing him to listen to a basic set of services, with the telephone connection being used to obtain a key for other (premium) content services.

In so far as the embodiments of the invention described above are implemented, at least in part, using software-controlled data processing apparatus, it will be appreciated that a computer program providing such software control and a storage or transmission medium by which such a computer program is stored or transmitted are envisaged as aspects of the present invention.

It is also noted that some of the arrangements and permutations described above may lead to a recovered file not being bit-for-bit identical with the original file before watermarking. However, there are equivalent ways within the MP3. and other encoding techniques for representing sound, so that an eventual file which is not bit-identical with the input file can still sound the same. For example, the data framing may differ, or the amount of unused ancillary_data space may differ. Such results are acceptable within the context of the embodiments of the invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method, implemented on an apparatus for processing a digital audio signal, of processing a digital audio signal, comprising:

spectrally encoding, at the apparatus, the digital audio signal to generate audio band data components representing audio contributions of said digital audio signal in respective ones of a set of frequency bands;

spectrally encoding, at the apparatus, a watermark audio signal using the same encoding as that applied to the digital audio signal, to generate watermark band data components representing audio contributions of said watermark audio signal in respective ones of said set of frequency bands;

altering, at the apparatus, a subset comprising one or more of said audio band data components by combining or replacing one or more of said audio band data components with corresponding ones of said watermark band data components to produce a band-altered digital audio signal having altered band data components;

generating, at the apparatus, recovery data to allow original values of said altered band data components to be reconstructed;

encrypting, at the apparatus, said recovery data; and storing, at the apparatus, said band-altered digital audio signal and said encrypted recovery data in a physical memory unit.

2. A method according to claim 1, in which said recovery data comprises said subset of said audio band data components.

3. A method according to claim 1, in which said subset of said audio band data components is a predetermined subset of said audio band data components.

4. A method according to claim 1, in which said recovery data defines which of said audio band data components are in said subset of said audio band data components.

5. A method according to claim 1, further comprising:

detecting which of said watermark band data components of said watermark audio signal are most significant over at least a portion of said watermark audio signal, said most significant watermark band data components forming said subset of said audio band data components.

6. A method according to claim 5, in which said detecting further comprises:

detecting which of said watermark band data components of said watermark audio signal are most significant over the entirety of said watermark audio signal.

7. A method according to claim 5, in which said watermark audio signal and said digital audio signal are each encoded as successive data frames representing respective time periods of said watermark audio signal and said digital audio signal, and said detecting further comprises:

detecting which of said watermark band data components of said watermark audio signal are most significant over a group of one or more of said data frames of said watermark audio signal, said most significant watermark band data components forming said subset of said audio band data components in respect of a corresponding group of one or more frames of said digital audio signal.

8. A method according to claim 1, further comprising:

detecting which of said watermark band data components of said watermark audio signal are most significant over at least a portion of said watermark audio signal, said most significant watermark band data components forming said subset of said audio band data components.

9. A method according to claim 8, in which said detecting further comprises:

detecting which of said watermark band data components of said watermark audio signal are most significant over the entirety of said watermark audio signal.

10. A method according to claim 8, in which said watermark audio signal and said digital audio signal are each encoded as successive data frames representing respective time periods of said watermark audio signal and said digital audio signal, and said detecting further comprises:

detecting which of said watermark band data components of said watermark audio signal are most significant over a group of one or more of said data frames of said watermark audio signal, said most significant watermark band data components forming said subset of said audio band data components in respect of a corresponding group of one or more frames of said digital audio signal.

11. A method according to claim 1, further comprising:

detecting which of said watermark band data components of said watermark audio signal differ most significantly from corresponding audio band data components of said digital audio signal over at least corresponding portions of said watermark audio signal and said digital audio signal, said most significantly differing watermark band data components forming said subset of said audio band data components.

12. A method according to claim 4, in which said audio band data components forming said subset of said audio band data components are defined by a pseudo-random function.

13. A method according to claim 1, in which said digital audio signal is stored in a data format having at least:

format-defining data specifying a quantity of data available to store said digital audio signal;

said audio band data components; and zero or more ancillary data space.

14. A method according to claim 13, further comprising storing said recovery data in said ancillary data space.

15. A method according to claim 13, further comprising altering said format-defining data to specify a larger quantity of data to store said digital audio signal, thereby increasing the size of said ancillary data space.

16. A method according to claim 1, further comprising appending said recovery data to said band-altered digital audio signal.

17. A method according to claim 1, further comprising adjusting the number of said audio band data components in said subset of said audio band data components in accordance with the data capacity available for said recovery data.

18. A method of distributing spectrally-encoded audio content material, said method comprising:

processing said spectrally-encoded audio content material in accordance with the method of claim 1 to form a band-altered digital signal and recovery data;

encrypting said recovery data to form encrypted recovery data;

supplying said band-altered digital signal and said encrypted recovery data to a receiving user; and supplying a decryption key, to said receiving user to allow said receiving user to decrypt said encrypted recovery data.

19. A method according to claim 18, wherein said supplying takes place only if a payment is received from said receiving user.

20. A computer readable storage medium containing program instructions for execution on a computer, which when executed by the computer, cause the computer to perform a method comprising:

spectrally encoding the digital audio signal to generate audio band data components representing audio contributions of said digital audio signal in respective ones of a set of frequency bands;

spectrally encoding a watermark audio signal using the same encoding as that applied to the digital audio signal, to generate watermark band data components representing audio contributions of said watermark audio signal in respective ones of said set of frequency bands;

altering a subset comprising one or more of said audio band data components by combining or replacing one or more of said audio band data components with corresponding ones of said watermark band data components, to produce a band-altered digital audio signal having altered band data components;

generating, at the apparatus, recovery data to allow original values of said altered band data components to be reconstructed;

encrypting said recovery data; and storing said band-altered digital audio signal and said encrypted recovery data in a physical memory unit.

21. An apparatus for processing a digital audio signal, comprising:

an encoder which spectrally encodes the digital audio signal to generate audio band data components representing audio contributions of said audio signal in respective ones of a set of frequency bands and separately spectrally encodes a watermark audio signal using the same encoding as that applied to the digital audio signal, to generate watermark band data components representing audio contributions of said watermark audio signal in respective ones of said set of frequency bands;

a data modifier configured to alter a subset comprising one or more of said audio band data components by combining or replacing one or more of said audio band data components with corresponding ones of said watermark band data components to produce a band-altered digital audio signal having altered band data components;

a data generator for generating recovery data to allow original values of said subset of said band data components to be reconstructed;

an encryption unit which encrypts said recovery data; and a memory unit being configured to store the band-altered digital audio signal and said encrypted recovery data.

22. A computer readable storage medium storing a band-altered digital audio signal having altered band data components and recovery data to allow original values of said altered band data components to be reconstructed, wherein the band-altered digital audio signal is produced from a spectrally encoded digital audio signal which generates audio band data components representing audio contributions of a digital audio signal in respective ones of a set of frequency bands, a spectrally encoded watermark audio signal which was spectrally encoded using the same encoding as that applied to the digital audio signal, and which generates watermark band data components representing audio contributions of said watermark audio signal in respective ones of said set of frequency bands, and the band-altered digital audio signal is produced by altering a subset comprising one or more of said audio band data components by combining or replacing one or more of said audio band data components with corresponding ones of said watermark band data components, and the recovery data is encrypted.

* * * * *